(12) United States Patent
Varone et al.

(10) Patent No.: US 9,223,894 B2
(45) Date of Patent: Dec. 29, 2015

(54) METHOD FOR PRODUCING AT LEAST A PORTION OF A DATA VISUALIZATION LAYOUT ON A DISPLAY OF A DEVICE PROVIDED WITH AT LEAST A SMART CARD, METHOD FOR CODIFYING A PLURALITY OF HTML INSTRUCTIONS AND CORRESPONDING SYSTEM

(75) Inventors: Francesco Varone, Bellona (IT); Amedeo Veneroso, Caserta (IT)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 767 days.

(21) Appl. No.: 12/790,492

(22) Filed: May 28, 2010

(65) Prior Publication Data

US 2010/0313115 A1    Dec. 9, 2010

(30) Foreign Application Priority Data

May 29, 2009   (IT) .............................. MI2009A0956

(51) Int. Cl.
    *G06F 17/00*    (2006.01)
    *G06F 17/30*    (2006.01)
(52) U.S. Cl.
    CPC ................................ *G06F 17/30896* (2013.01)
(58) Field of Classification Search
    CPC .... G06F 17/30; G06F 17/272; G06F 17/3089
    USPC ........................................................ 715/243
    See application file for complete search history.

(56) References Cited

U.S. PATENT DOCUMENTS

| | | | | |
|---|---|---|---|---|
| 5,551,068 | A  * | 8/1996  | Goldsmith et al. | 370/466 |
| 5,901,303 | A  * | 5/1999  | Chew | 711/115 |
| 6,178,336 | B1 * | 1/2001  | Crozat | 455/558 |
| 7,200,842 | B1 * | 4/2007  | Susser et al. | 717/159 |
| 2003/0004937 | A1 * | 1/2003 | Salmenkaita et al. | 707/3 |
| 2003/0037065 | A1 * | 2/2003 | Svab | 707/104.1 |
| 2004/0015852 | A1 * | 1/2004 | Swetland | 717/118 |
| 2004/0181748 | A1   | 9/2004 | Jamshidi et al. | 715/503 |
| 2005/0021712 | A1 * | 1/2005 | Chassapis et al. | 709/223 |
| 2005/0277432 | A1 * | 12/2005 | Viana et al. | 455/466 |
| 2008/0112411 | A1 * | 5/2008 | Stafford et al. | 370/392 |
| 2008/0201356 | A1   | 8/2008 | Jou | 707/102 |

* cited by examiner

*Primary Examiner* — Kavita Padmanabhan
*Assistant Examiner* — Andrew McIntosh
(74) *Attorney, Agent, or Firm* — Allen, Dyer, Doppelt, Milbrath & Gilchrist, P.A.

(57) ABSTRACT

A method for generating at least one portion of a data display layout on a display of a device equipped with at least one smart card may include generating a code sequence to define at least one portion of the data display layout and to store the code sequence in the at least one smart card. Each code of the code sequence may have a first portion including a first numerical code, and a second portion including a second numerical code. The first numerical code may correspond to a coded primitive action suitable to produce at least one part of the display layout. The second numerical code may correspond to a coded item of data correlated with a respective primitive action. The method may further include processing the code sequence to generate, on the device display at least one part of the display layout with the items of data in predefined positions of the layout.

16 Claims, 12 Drawing Sheets

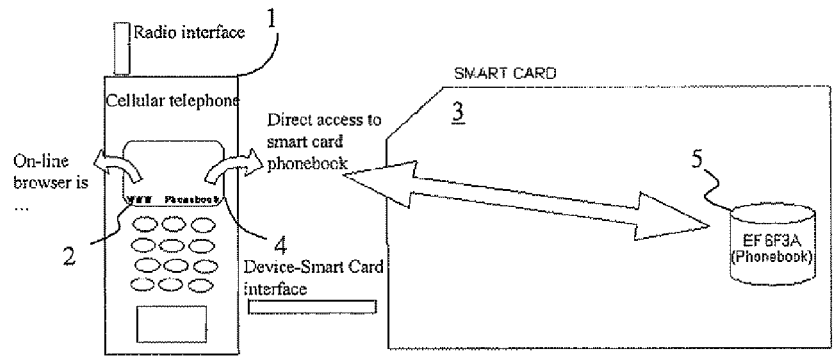
Fig. 1
(PRIOR ART)
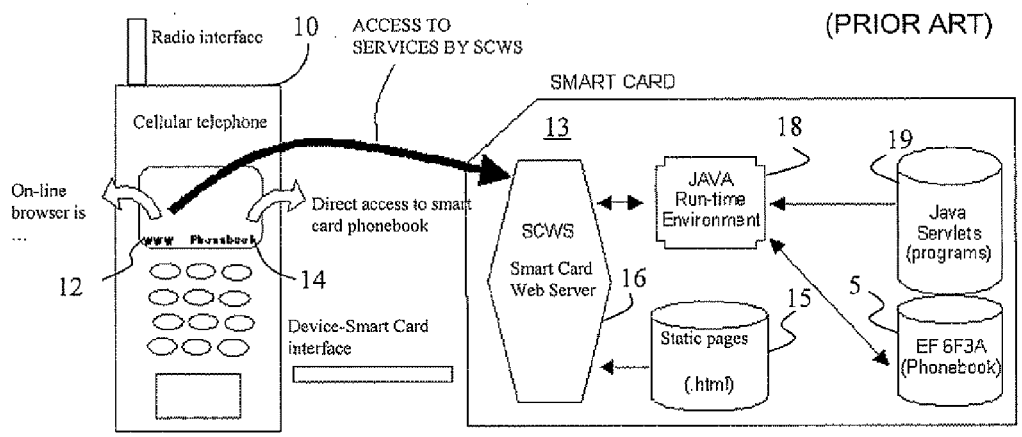
Fig. 3
(PRIOR ART)
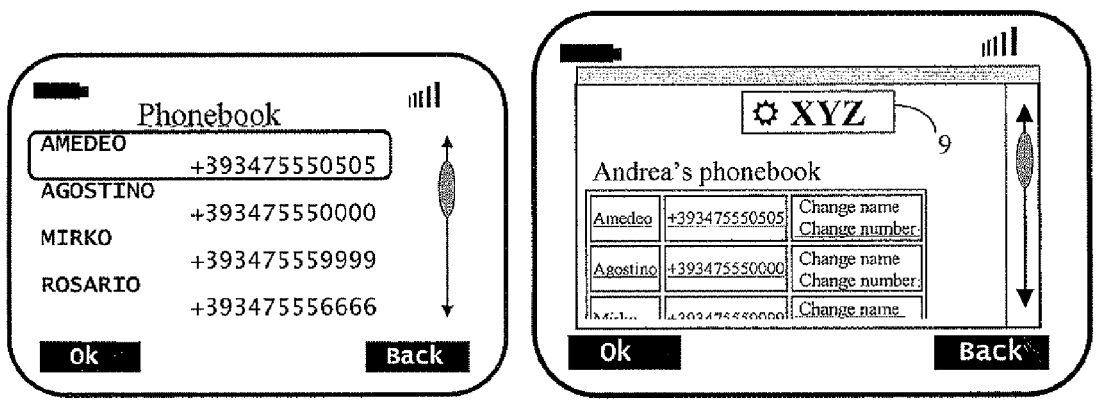
Fig. 2
(PRIOR ART)
Fig. 4
(PRIOR ART)

```
<html>
  <head>
    <title>Test PHP</title>
  </head>
  <body>
  <?php echo "Hello World!<p>"; ?>
  </body>
</html>
```

Fig. 5A
(PRIOR ART)

```
<html>
  <head>
    <title>Test PHP</title>
  </head>
  <body>
Hello World!<p>
  </body>
</html>
```

Fig. 5B
(PRIOR ART)

```
<?php
if (strstr($_SERVER["HTTP_USER_AGENT"],
"MSIE")) {
?>
<h3>strstr should return true</h3>
<center><b>You're using Internet
Explorer</b></center>
<?php
} else {
?>
<h3>strstr should return false</h3>
<center><b>You're using another
browser</b></center>
<?php
}
?>
```

Fig. 6A
(PRIOR ART)

```
<h3>strstr should return true</h3>
<center><b>You're using Internet
Explorer</b></center>
``` or

```
<h3>strstr should return false</h3>
<center><b>You're using another
browser</b></center>
```

Fig. 6B
(PRIOR ART)

| strstr should return true |
| You're using Internet Explorer |

Fig. 7A
(PRIOR ART)

| strstr should return false |
| You're using another browser |

Fig. 7B
(PRIOR ART)

✿ XYZ

*Andrea's* phonebook

| Amedeo | +393475550505 | Change name |
| --- | --- | --- |
| | | Change number |
| Agostino | +393475550000 | Change name |
| | | Change number |
| Mirko | +393475559999 | Change name |
| | | Change number |

Fig. 10

✿ XYZ

*Andrea's* phonebook

| Amedeo Link to detail.html?p=1 | +393475550505 clicking initiates call (only from mobile phone browser) | Change name Link to changename.html?p=1 Change number Link to changenumb.html?p=1 |
| --- | --- | --- |
| Agostino Link to detail.html?p=2 | +393475550000 clicking initiates call (only from mobile phone browser) | Change name Link to changename.html?p=2 Change number Link to changenumb.html?p=2 |
| Mirko Link to detail.html?p=3 | +393475559999 clicking initiates call (only from mobile phone browser) | Change name Link to changename.html?p=3 Change number Link to changenumb.html?p=3 |

Fig. 11

| 01 | TITLE |
| 02 | PUT FILE |
| 03 | SET |
| 04 | SELECT FILE |
| 05 | TABLE |
| .... | ...... T1 |

Fig. 14

| A1 | is | varK |
| A2 | is | varN |
| A3 | is | varADN |
| A4 | is | varNumTel |
| ................. | | T2 |

<center>
<img src=EF_6101.gif alt="XYZ"><br>
</center>
<h2>
Phonebook of<i>Andrea</i>
</h2>
<br><br>
```
80

Fig. 16

```
Mnemonic
TITLE "Phonebook"
PUT FILE 6F95
SET varK=1
SELECT 7F20 6F3A
TABLE
label1:
        ROW
        varN = READ RECORD varK, offset=0, len=12
        CELL
        PUT LINK varN, "details.html?p="+varK
        CELL
        varADN = READ RECORD varADN, varK, offset 12, len 20
        varNumTel = SWAPPED varADN
        PUT LINK varNumTel, "tel:"+ varNumTel
        CELL
        PUT LINK " Change name ", changename.html?p="+varK
        PUT TEXT "<br>"
        PUT LINK " Change number", changenumb.html?p="+varK
        INCREMENT varK
        IF varK!=250 GOTO label1
END TABLE
```

Fig. 17

| HTML | HB language |
|---|---|
| <html> | No instruction required |
| <head> | |
| <title>xxx</title> | TITLE "xxx" |
| </head> | No instruction required |
| <body> | |
| <table border=1> | TABLE |
| <tr> (if it is the first occurrence in a table) | ROW |
| </tr><tr> | ROW |
| <td> (if it is the first occurrence in a row) | CELL |
| </td> | CELL |
| <td> | |
| <a href=xxx>yyy</a> | PUT LINK yyy, xxx |
| <img src=aaa> | PUT IMG 6Fxx<br>Wherein 6Fxx is the name of an EF of the SIM wherein the content of the graphic file aaa is to be separately stored.<br>In phase of execution of the winxlet, the latter will produce <img src=EF_6Fxx.gif> or <img src=EF_6Fxx.jpg>.<br>The webserver system will be configured in order to compare the file name EF_6Fxx and the SIM's EF. |
| <img src=xxx alt="yyy"> | PUT IMG 6Fxx, yyy |
| Complex html code portions, for instance<br><center><br><img src=EF_6101.gif alt="XYZ"><br><br></center><br><h2><br>Phonebook of <I>Andrea</I><br></h2><br><br><br> | PUT FILE 6Fxx<br>Wherein 6Fxx is the name of an EF of the SIM wherein a html code portion is to be separately stored.<br>In phase of execution of the winxlet, the latter will produce |

Fig. 18

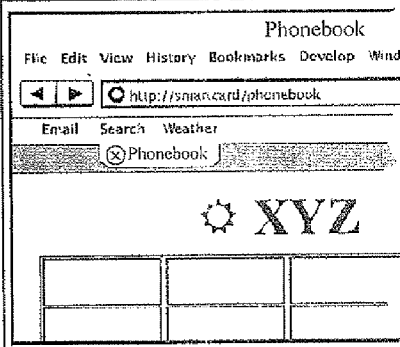

Fig. 20

| HTML | HB language | HB code (in hex) |
|---|---|---|
| `<html>`<br>`<head>` | No instruction required | |
| `<title>Phonebook</title>` | TITLE "Phonebook" | 01 len 52756272696361    50 |
| `</head>`<br>`<body>` | No instruction required | |
| `<center>`<br>`<img src=EF_6101.gif alt="XYZ"><br>`<br>`</center>`<br>`<h2>`<br>`<i>Andrea's</i> phonebook`<br>`</h2>`<br>`<br><br>` | PUT FILE 6F95 | 02 len 6F95    51<br><br>52 |
| | SET varK=1 | 03 len A1 01 |
| | SELECT 7F20 6F3A | 04 len 7F20 6F3A |
| `<table border=1>` | TABLE | 05 len *(len is here equal to zero)* |
| | label1: | |
| `<tr>` | ROW | 06 len |
| | varN = READ RECORD varK, offset=0, len=12 | 07 len A2 A1 00 0C |
| `<td>` | CELL | 08 len |
| `<a href=detail.html?p=1>Amedeo</a>` | PUT LINK varN, "details.html?p="+varK | 09 len sublen 7FA2<br>4657461696C732E687 46D6C3F7<br>03D 7FA1    70 |

Fig. 19A

| | | |
|---|---|---|
| `</td>`<br>`<td>`<br>Amedeo | CELL | 08 len |
| | varADN = READ RECORD varK, offset 12, len 20 | 07 len A3 A1 0C 14 |
| | varNumTel = SWAPPED varADN | 0A A4 A3 |
| `<a href="tel:+393475550505">`<br>`+393475550505</a>`<br>Amedeo +393475550505 | PUT LINK varNumTel, "tel:"+ varNumTel | 09 len sublen 7FA4 74656C3A 7FA4 |
| `</td>`<br>`<td>` | CELL | 08 len |
| `<a href=changename.html?p=1>Change name</a>`<br>50505 Change name / Change number | PUT LINK "Change name", "changename.html?p="+ varK | 09 len sublen<br>4D6F6469 66696361 206E6F6D 65<br>6368616E 67652E68 746D6C 3F703D 7FA1 } 71 |
| `<br>` | PUT TEXT "`<br>`" | 0B len 3C62723E |
| `<a href=changenumb.html?p=1>Change number</a>`<br>50505 Change name / Change number | PUT LINK "Change number", "changenumb.html?p="+varK | 09 len sublen<br>4D6F6469 66696361 206E756D 6265726F<br>6368616E 67652E68 746D6C 3F703D 7FA1 } 72 |
| | INCREMENT varK | 0C len A1 |
| | IF varK!=250 GOTO label1 | 0D F2 A1 FA |
| `</tr>`<br>`<tr>` | label1:<br>ROW | |
| ... | ... | |
| `</td>`<br>`</tr>`<br>`</table>` | END TABLE | 0E |
| `</body>`<br>`</html>` | No instruction required | |

Fig. 19B

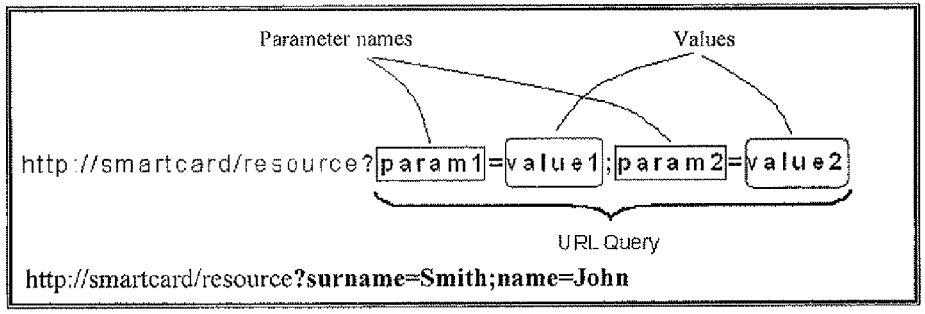

Fig. 21

| HB language | HB Code (in hex) | HTML |
|---|---|---|
| No instruction required | | <html><head> |
| No instruction required (the default string has been used for the title, in the absence of a command TITLE) | | <title>HB Interpreter</title> |
| No instruction required | | </head><body> |
| varP1=PARSE URL "name" | 1A len A1 6E6F6D65 | 55 |
| varP2=PARSE URL "Surname" | 1A len A2 636F676E6F6D65 | |
| PUT TEXT "Your name is "+varP1+" "+varP2  56 | 0B len 5469206368696 6D6920 7FA1 20 7FA4  57 | Your name is John Smith |
| No instruction required | | </body></html> |

Fig. 22

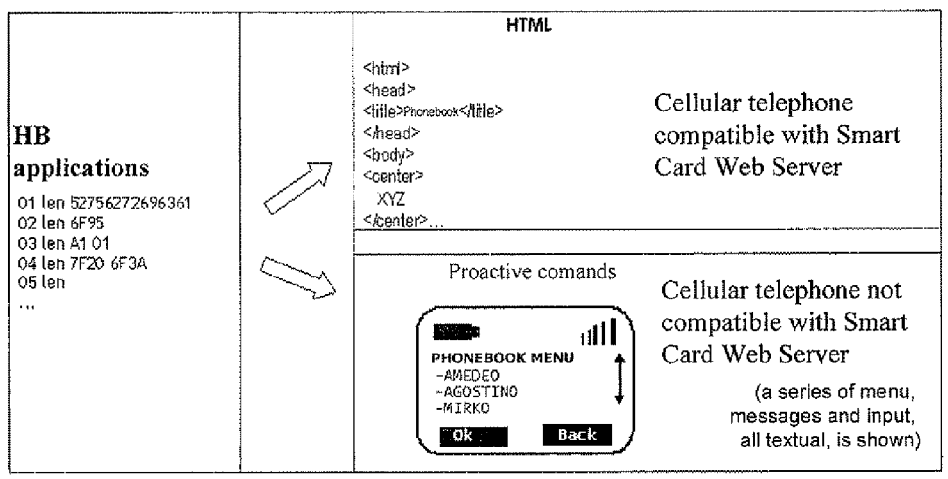

```
import uicc.scws.*;

public class servletExample extends ScwsExtensionService
{
    private byte[] requestQueryArray = new byte[255];
```

```
// Two static arrays of byte with the phrases:
// "nome=" e "cognome="
    private static byte[]    paramName     = {(byte) 'n',(byte) 'o',(byte) 'm',(byte) 'e',
                                              (byte) '='};
    private static byte[]    paramLastName = {(byte) 'c',(byte) 'o',(byte) 'g',(byte) 'n',
                                              (byte) 'o',(byte) 'm',(byte) 'e',(byte) '='};
```

```
// Array with the character "space"
    private static byte[]    pace          = {(byte) ' '};
```

```
// Array with the invariant portion that must appear on the page before the name and the surname,
// for example "Your name" and everything about HTML syntax.
//
// <html><head><title>Javacard servlet</title></head><body>Your name
    private static byte[]    constantText  = {(byte) '<',(byte) 'h',(byte) 't',(byte) 'm',
                                              (byte) 'l',(byte) '>',(byte) '<',(byte) 'h',
                                              (byte) 'e',(byte) 'a',(byte) 'd',(byte) '>',
                                              [...]
                                              (byte) '<',(byte) 'b',(byte) 'o',(byte) 'd',
                                              (byte) 'y',(byte) '>',
                                              (byte) 'Y',(byte) 'i',(byte) ' ',(byte) 'c',
                                              (byte) 'h',(byte) 'i',(byte) 'a',(byte) 'm',
                                              (byte) 'i',(byte) ' '};
```

```
// Array with the closing tag of the HTML page
    private static byte[]    trailerTags = {(byte) '<',(byte) '/',(byte) 'b',(byte) 'o',
                                            (byte) 'd',(byte) 'y',(byte) '>',(byte) '<',
                                            (byte) '/',(byte) 'h',(byte) 't',(byte) 'm',
                                            (byte) 'l',(byte) '>'};
```

```
// The function doPost() is invoked by the system when the user
// accesses to a page whose path corresponds to that to which the servlet is registered
public void doPost(HttpRequest request, HttpResponse response)
{
    short query_length;
```

```
    // using the object response, the servlet prepares what is necessary to view the page. In this case, the initial
    // invariant portion "Your name"
    response.appendContent(constantText, (short) 0, (short) constantText.length);
```

```
    // using the object request, the servlet can access all the information about the page request, including the URL.
    // Here, the entire query is copied into a separate empty array, for subsequent processing
    query_length =
      request.findAndCopyKeywordValue(ScwsConstants.URI_QUERY_TAG,
                                      requestQueryArray, (short) 0,
                                      (short) requestQueryArray.length);
```

```
    // due to the invocation appendParamValue the value of a parameter, that is automatically identified in the query
    // previously stored in the array requestQueryArray, is placed on the page. In this case, the parameter
    // "name =" is searched, even if it was not the first to appear in the URL.
    appendParamValue(response, query_length, paramName);
```

```
    // a character of space is inserted in order to separate the two values received as
    // parameters of the URL.
    response.appendContent(space, (short) 0, (short) 1);
```

```
    // In this case the parameter "surname" is processed
    appendParamValue(response, query_length, paramLastName);
```

```
    // Close the HTML page.
    response.appendContent(trailerTags, (short) 0, (short) trailerTags.length);
}
```

Fig. 24A

```
/**
 * AppendParamValue () function searches the URL parameter in the array requestQueryArray
 * Whose name (including the sign "=") is stored in the ParamArray passed to the function.
 * The value of the URL parameter so identified, is included in the HTTP response or in the body page.
 *
 * @ param response        reference object HttpResponse provided from the system to the servlet is invoked
 *                         with doPost () or doGet ().
 * @ Param query_length    the amount of data meaningful into the array RequestQueryArray (field class).
 * @ Param ParamArray      reference to an array of bytes containing the name of the URL parameter (including '=').
 *                         The entire array is taken into account (from the first element to its entire length).
 */
private void appendParamValue(HttpResponse response,
                    short query_length, byte[] paramArray)
{
    short i;
    short param_value_offset;

// Searching the parameter into the URL query and place it on the value param_value_offset = findString(paramArray,
                        requestQueryArray, (short) 0, query_length);

// Seeking the end of the value of the parameter identifying the character ';' or until
    // the end of the query
    for(i=param_value_offset; i<query_length; i++)
    {
        if (requestQueryArray[i]==';') break;
    }

// Adding the value of which is calculated offset and lenght
    response.appendContent(requestQueryArray, (short) param_value_offset,
                        (short) (i-param_value_offset));
}

/**
 * FindString () function performs a general search into the array
 * Buffer of the sequence contained in the array ParamArray.
 * Returning the offset into the buffer of the first character following
 * to the sequence researched.
 *
 * @ Param ParamArray       reference to an array of bytes containing the sequence
 *                          URL parameter (including '='). The entire array is taken into account
 *                          (the first element and for its entire length).
 * @ Param buffer           byte array wherein make the searching
 * @ Param start_offset     offset in buffer from which start the searching
 * @ Param max_offset       offset at which to stop the searching if no correspondence is found
 *
 * @ Return                 offset of first character following to the sequence searching
 */
private short findString(byte[] paramArray
                byte[] buffer,    short start_offset, short max_offset)
{
    // The implementation of this function is omitted for simplicity
    [...]
}
```

Fig. 24B

METHOD FOR PRODUCING AT LEAST A PORTION OF A DATA VISUALIZATION LAYOUT ON A DISPLAY OF A DEVICE PROVIDED WITH AT LEAST A SMART CARD, METHOD FOR CODIFYING A PLURALITY OF HTML INSTRUCTIONS AND CORRESPONDING SYSTEM

FIELD OF THE INVENTION

The present invention relates to a method for generating at least one portion of a data display layout on a display of a device equipped with at least one smart card. The invention also relates to a method for coding a plurality of HTML instructions, comprising respective HTML elements, suitable to generate a data display layout. The invention furthermore relates to a system for generating a data display layout on a display of a device equipped with at least one smart card.

BACKGROUND OF THE INVENTION

As it may be known, there may be an ever greater expectation that a device with a smart card, namely an integrated circuit card equipped with a microprocessor, will manage the exchange of information between software applications and the user by sequences of interactive screens. The term "interactive screen" is taken to mean an overall view of items of data appropriately displayed on the screen of the device. It may be possible for the user to observe, select, confirm, and/or modify such data by acting on appropriate input peripherals or provided buttons, joystick, touch screen, stylus, trackwheel, trackball, etc.

However, to meet such requirements and to find widespread and advantageous use, when creating such screens, the smart cards should be suitable to occupy few memory resources, because, as may be known, a smart card has limited memory due to its design, and be suitable to generate pages quickly to be able to meet user requirements to the greatest possible extent. The most common devices with smart cards are cellular telephones, handheld computers, personal computers equipped with a dedicated port, routers, anti-theft systems, and other similar devices.

Prior art teaches making interactive screens, such as, for example, a phonebook in a cellular telephone by displaying a list of data on a display. In such a case, as shown in FIG. 1, a cellular telephone 1, equipped with a smart card 3, accesses by appropriate communications protocols, such as standard technical specifications ISO 7816-3 and ISO 7816-4, files held in the smart card 3 memory by a dedicated application, stored in the cellular telephone 1 and activatable, for example, of a phonebook button 4.

The elementary file or EF 5 of the smart card, which comprises the phonebook stored in a standard format, is identified with the hexadecimal code EF 6F3A and, as may be known, is a GSM file according to technical specification 3GPP TS 51.011, and contains the phonebook data. A display layout of such a phonebook is shown in FIG. 2, and in this case EF 5 comprises:

first record: Amedeo Amedeo's number second record: Agostino Agostino's number and so on. On a user request, by pressing the phonebook button 4, EF 5 is opened and its content, appropriately interpreted, is displayed on the display.

This kind of application, while adequate, may be unattractive to a user wishing to interact quickly with the data displayed and stored in EF 5, for example, by changing names and telephone numbers, or associating a photo or email account addresses with each contact or other multimedia application. Furthermore, users may express greater demand for screens comprising portions which are automatically updated each time the application is activated, for example, to display information regarding the weather, the latest news from a news service, or commercial information relating to a telephone operator or other similar functions. Furthermore, one disadvantage may be associated with the interface, namely the numeric keypad, which cellular telephones have, because interaction with the data is somewhat complex to manage using such numeric keys.

One approach for overcoming such disadvantages is to make display layouts using a web or World Wide Web type interface, namely a display similar to the web pages displayed on the internet. Such a display layout may enhance interactivity between the user and device and to exploit the potential of the web pages themselves. Furthermore, a greater variety of controls and interaction may be available using check boxes, radio buttons, multiple selections, and text fields, which can be accessed, for example, with a joypad, multifunction keypads, or touch screens.

One approach, shown in FIG. 3, provides a second type of cellular telephone 10, which comprises a browser 12, which may be activated with standard functionality for Internet browsing, by a radio-signal interface, and may be activated to communicate directly with a smart card 13 when the entered URL address is of a predefined type, for example http://smartcard/. Such a browser 12 may also be known as a "web browser".

As it may be known, web pages may be created by strings of HTML instructions belonging to the HTML (acronym for HyperText Markup Language) markup language. A communications protocol used for exchanging data between the web pages stored on the smart card and the web browser running on the cellular telephone is documented in technical specification OMA TS Smart Card Web Server version 1.0 and subsequent versions, supervised by the Open Mobile Alliance, a consortium also known by the acronym OMA. The OMA TS Smart Card Web Server specification adopts some mechanisms already in use by internet web servers and other mechanisms present in the GSM protocol, for example, SIM Applied Toolkit Bearer Independent Protocol, also known by the acronym SIP, such as technical specification ETSI TS 101 267, in turn based on 3GPP TS 51.014.

In such a case, the smart card 13 may include a web server 16 or Smart Card Web Server, which enables the transmission of both static and dynamic web-like pages described using strings of HTML instructions to the browser 12. Static web-like pages may be stored in a memory portion of the smart card 13, held, for example, in a static page file 15, and transferred by the web server 16 to the browser 12 without further processing.

Dynamic web-like pages, in the case of the present example, may be created by instructions executed by a JcRE or Javacard Run-time Environment block 18 based upon instructions stored in the Java™ Servlets subblock 19, and with appropriate access to some files stored in the smart card, such as specifically the phonebook elementary file EF 5. In such a case, the phonebook display layout on the display of the cellular telephone 10 may be of greater or lesser complexity, an example being shown in FIG. 4. Such a phonebook may be personalized because the JcRE block 18 of the smart card 13 may allow storage of display preferences for each user, for example, with the indication "Andrea's phonebook". Furthermore, in addition to the name and telephone number, each row of the display layout may include two links respectively making it possible to "Change name" and "Change number".

Moreover, a logo or trademark, indicated schematically in FIG. 4 with the number 9, or the use of specific colors associated with a telephone operator connected to the smart card 13 may be displayed automatically. In particular, the appearance of the display layout may be independent of the device used.

The phonebook may also be displayed by making use of the conventional dedicated application stored on the cellular telephone 10, which may be activated, for example, by the phonebook button 14, in a similar manner to the previously described example, with the data obtained from EF 5 of the smart card 13. In this case, the phonebook display layout may have an appearance and a structure which may vary depending on the device into which the smart card 13 has been inserted.

Such an approach involving the creation of dynamic web-like pages by strings of HTML instructions, while satisfactory in many respects, does however exhibit several major disadvantages. In particular, it may be known that the basic structure of the HTML language, known as an HTML element, is enclosed within markup tags. Each tag is made up of a sequence of characters enclosed between two angle brackets, as shown for example in FIG. 5B. Some strings of HTML elements may include an "opening tag" and a "closing tag", while in others, the closing tag is optional. Based upon suitable string coding, some tags may have the function of formatting the stated data as items of information, defining their font, color and shape, while others have the function of indicating specific, defined applications to the browser, such as, for example, that of permitting certain actions by the user, and others make it possible to insert an image at a given location on the generated page web and so on.

HTML instruction strings are accordingly of a descriptive nature and may be somewhat lengthy, requiring considerable time to be processed and transmitted to the cellular telephone browser, even if transmitted in a compacted form. Furthermore, such HTML instruction strings may require considerable memory resources in the smart card to be processed.

It may also be well known that HTML instructions allow the inclusion of other instructions, processed by the server before transmission, making it possible to add control of the graphic resolution of the displayed layout, sections to be "conditionally" displayed, dynamic interaction with the user, interactive animation and multimedia content for creating dynamic web-like pages. Various programming languages have been developed for this purpose. Among the most widely used languages are ASP, based on Microsoft® development elements, JSP, based on Java™ oriented technology, and PHP, the acronym for Hypertext Preprocessor, which is a scripting language.

FIG. 5A shows an example of PHP language, processing of which produces the HTML instruction strings shown in FIG. 5B. In the example, the text shown in bold "<?php echo "Hello World!<p>"; ?>" replaces the text "Hello world!<p>" in HTML language.

Such possible and attractive applications may make processing considerably more complex, and the above-stated disadvantages more serious. FIGS. 6A and 6B further show an example of HTML instruction strings in a mixed HTML-PHP language, while FIGS. 7A and 7B show the corresponding display layout. In each case, instruction strings in PHP language, although permitting a quantitative reduction in the content of the processing files, but not a reduction in occupied memory space, may increase the speed of transmission to the web browser and the speed of execution of such instructions by the browser, and consequently may diminish, but may not overcome the above-stated disadvantages by increasing the processing load for a web server.

The technical problem underlying the present invention is that of making and providing a method for generating at least one portion of a data display layout on a device equipped with at least one smart card having structural and functional features of a nature to permit a dramatic reduction in the memory resources for the smart card allowing acceleration of processing: the method may be simultaneously usable to code HTML instructions and being readily implemented in systems for generating a display layout on a display of a device comprising at least one smart card, thus overcoming the limits and the drawbacks still affecting the prior art methods and devices.

SUMMARY OF THE INVENTION

The approach underlying the present invention is that of saving parts of the data display layout in the smart card's memory and generating the remaining parts by numerical coded instructions dedicated to laying out dynamic web-like pages. Based upon this approach, the technical problem is addressed by a method for generating at least one portion of a data display layout on a display of a device equipped with at least one smart card. The method may include generating a code sequence suitable to define the at least one portion of a data display layout and to store the code sequence in the at least one smart card. Each code of the code sequence may have a first portion including a first numerical code and a second portion including a second numerical code. The first numerical code may correspond to a coded primitive action suitable to produce the at least one portion of a display layout. The second numerical code may correspond to a coded item of data correlated with a respective primitive action. The method may also include processing the code sequence to generate on the display of the device, the at least one portion of the display layout with the items of data in predefined positions in the layout.

Advantageously, according to one aspect, the method may include a first coding step suitable to code the primitive actions by generating a first correlation table. The method furthermore may include a second step suitable to code a sequence of variables associated with a respective item of data by generating a second correlation table associating a corresponding third numerical code with each variable The third numerical code may be included in the second portion.

According to a further aspect, at least one primitive action may include the step of associating one of the items of data with a plurality of instruction strings stored in an elementary file of the at least one smart card. The elementary file may be programmable.

According to a further aspect, the method may include the step of associating, with each second portion, at least one byte suitable to define the length of the second numerical code comprising the item of data. The method may provide that at least one primitive action comprises the step of processing a URL string including a URL address for determining at least one of the items of data. The URL address may be the address suitable to activate communication between the at least one smart card and a browser of the aid device.

The problem may also be addressed by a method for coding a plurality of HTML instructions comprising respective HTML elements suitable to generate at least one portion of a data display layout. The method may include generating a code sequence to define the at least one portion of a data display layout. Each code of the code sequence may have a first portion including a first numerical code and a second portion including a second numerical code. The method may include generating a plurality of primitive actions correlated with the HTML elements and making a first correlation table by coding the primitive actions with a corresponding first numerical code. The method may further include generating the first portion by comparing the HTML instructions with the primitive actions included in the first correlation table to define a corresponding first numerical code for the HTML element, and generating the second portion by coding the respective HTML element to produce an item of data from the plurality of items of data.

According to a further aspect, the method may include the step of storing a plurality of HTML elements suitable to define one of the items of data in an elementary file of the at least one smart card, and the step of associating the elementary file with at least one primitive action. According to a further aspect, the method may include the step of defining the length of the second numerical code and the step of associating the length with at least one byte of the second portion.

The problem may also be addressed by a system for generating at least one portion of a data display layout on a display of an electronic device equipped with at least one smart card comprising instructions suitable to generate the at least one portion of a data display layout. The instructions may be a code sequence and that each code has a first portion comprising a first numerical code and a second portion comprising a second numerical code. The at least one smart card may include a first coding means, or first circuit, suitable to generate the first numerical code, by coding primitive actions associated with the instructions, together with a second coding means, or second circuit, suitable to generate the second numerical code, corresponding to an item of data correlated with a respective primitive action. The code sequence may be processed by the at least one smart card to create the at least one portion of a data display layout on the display of the device by setting the items of data in predefined positions in the layout. Advantageously, an elementary file stored in the at least one smart card may include a plurality of HTML elements suitable to define one of the items of data.

According to a further aspect, the plurality of HTML elements of the elementary file is processed by a web browser of the device. A web browser prototype for cellular telephones suitable to request web pages, in HTML format, from a smart card by a proprietary protocol has been created by the present applicant by adapting an open-source browser written in Java™ 2 Mobile Edition language.

According to a further aspect, the at least one smart card may include means, or a processor, to define the length of each second numerical code of the second portion. Such length may be stored in at least one byte of the second numerical code.

According to another aspect, the system may include a means or a processor suitable to process a URL string for determining the first numerical code and the second numerical code of the instructions. The URL string may include a URL address suitable to activate communication between the at least one smart card and the web browser of the device.

The features and advantages of the method and system according to the invention will become clear from the following description of an exemplary embodiment thereof, which is given purely by way of non-limiting examples with reference to the appended drawings.

BRIEF DESCRIPTION OF THE DRAWINGS

FIG. 1 is a schematic diagram of a cellular telephone and a smart card according to the prior art;

FIG. 2 is a schematic representation of a display layout of a non-web-like page, in particular a phonebook according to the prior art, created by the cellular telephone directly accessing the phonebook data present in the smart card;

FIG. 3 is a schematic diagram of a further cellular telephone and a smart card equipped with Smart Card Web Server according to the prior art;

FIG. 4 is a schematic representation of a display layout of a dynamic web-like page, in particular a phonebook according to the prior art;

FIGS. 5A and 5B respectively represent PHP instruction strings inserted in an HTML code and derived instructions of pure HTML code by way of comparison;

FIGS. 6A and 6B respectively represent mixed HTML-PHP instruction strings and two possible alternative derived instructions;

FIGS. 7A and 7B represent two data display layouts that are derived from the instructions stated in FIGS. 6A and 6B;

FIG. 10 shows a phonebook display layout according to the present invention;

FIG. 11 shows a further example of a phonebook display layout in which some functional applications are clarified;

FIGS. 14 and 15 respectively illustrate a portion of a first and a second correlation table, according to the present invention;

FIG. 16 is a example of an elementary file with HTML instruction strings;

FIG. 17 shows a listing of mnemonic code instructions for a coding according to the present invention;

FIG. 18 is a comparison between a portion of a listing with HTML instruction strings and a listing of mnemonic code for a coding according to the present invention;

FIGS. 19A and 19B show a single listing with HTML instruction strings, together with a corresponding listing of the mnemonic code and numerical code according to the present invention for making the dynamic web-like page shown in FIG. 10;

FIG. 20 shows a portion of FIG. 19A wherein the mnemonic code is absent;

FIG. 21 shows a request to a smart card by means of a URL string and a respective example of a request;

FIG. 22 shows a coding of the request example of FIG. 21 according to the method of the present invention;

FIG. 23 shows a display layout obtained from a numerical code listing, made according to the present invention, and displayed on a display of a cellular telephone which is not compatible with a smart card with web server and the corresponding coding in HTML instructions; and FIGS. 24A and 24B show an example of a same listing in the Javacard language that allows processing of the URL string in the example shown in FIG. 21.

DETAILED DESCRIPTION OF THE PREFERRED EMBODIMENTS

Figure 8:
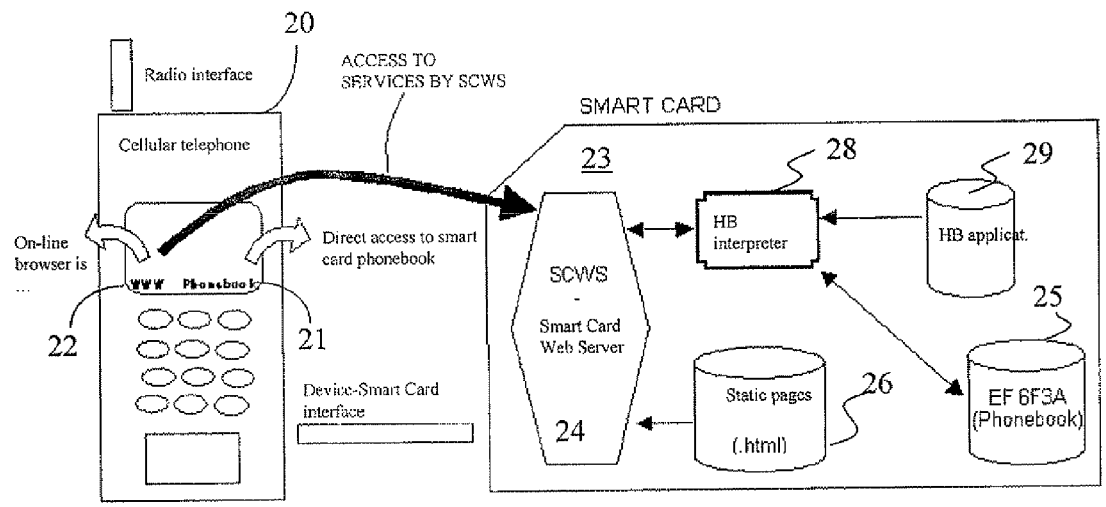
FIG. 8 is a schematic diagram of a cellular telephone and a smart card according to the present invention.

With reference to these Figures, and in particular to FIG. 8, reference number 20 denotes a device with a smart card 23 suitable to generate a data display layout processed by a method according to the present invention. Purely by way of non-limiting example, the electronic device is a cellular telephone, and the display layout described is a phonebook. The examples given are not exhaustive, but merely indicative for a person skilled in the art. The device may, of course, alternatively be a handheld computer, a personal computer equipped with a dedicated smart card port, a router, an anti-theft system, or similar electronic devices.

According to the embodiment shown, the cellular telephone 20 comprises a web browser 22, which with standard functionality allows a connection to a network of the WEB type, by a radio-signal interface, and also allows direct communication with the smart card 23 by entering a predefined URL address, for example, http://smartcard/. The smart card 23 comprises a web server 24, which is able to process appropriate instructions for generating web-like pages, which may be static or dynamic.

The cellular telephone 20 may also comprise a phonebook 21, which interfaces with the smart card with GSM commands to read and update the data present in an elementary file EF 25, in particular file 6F3A, stored in the Smart Card 23, using known methods as indicated in FIG. 1, and to display such data on an interactive screen of conventional type, namely not transmitted by HTML instructions, in accordance with the example shown in FIG. 2. The static web-like pages are stored in a memory portion of the smart card 23, included, for example, in a static page file 26, and transferred by the web server 24 to the display of the cellular telephone 20 without further processing.

According to a first aspect, the smart card 23 comprises a first block 28, which interfaces with the web server 24 and interacts with a second block 29. The first block 28 comprises predefined code sequences and appropriate coding suitable to define a plurality of data displays. The second block 29 comprises appropriate complementary instructions.

In particular, according to the exemplary embodiment shown in FIG. 8, the first block 28 may be made by a "Bytecode-to-HTML" interpreter. The second block 29 comprises Bytecode-to-HTML applications. The first block 28 and the second block 29 interact with the web server 24 for relatively rapid making of dynamic web-like pages, such as, for example, a dynamic phonebook 30 shown in FIG. 10, using reduced memory resources, as will become clearer from the following description.

According to the embodiment shown, the dynamic phonebook 30 comprises a header zone 31 and a data zone 32, the latter in tabular form, thus comprising a plurality of rows 33*a*, 33*b*, 33*c*, etc. each associated with a name or contact 40*a*, 41*a*, 42*a*, etc., inserted in the first column 35*a*. The second column 35*b* comprises a telephone number 40*b*, 41*b*, 42*b*, etc., associated with the contact 40*a*, 41*a*, 42*a*, etc., while the third column 35*c* comprises a first link 40*c*, 41*c*, 42*c* and a second link 40*d*, 41*d*, 42*d*, associated with corresponding change actions. In particular, the first link 40*c*, 41*c*, 42*c* makes it possible to change the name associated with contact 40*a*, 41*a*, 42*a*, while the second link 40*d*, 41*d*, 42*d* makes it possible to change the corresponding telephone number 40*b*, 41*b*, 42*b*, etc.

According to one aspect, the display layout may vary depending on requirements, and may comprise a layout of a standard structure maintained according to a predefined setting, or may vary depending on user requirements or needs during use of the dynamic phonebook 30 by changing or adding data associated with each contact 40*a*, 41*a*, 42*a*. For example, groups of contacts may be created, or images, photos, or other items may be associated with each contact, and may include a link with an email address of an email account or with a URL address, and so on.

According to a further aspect, as shown in FIG. 11, the phonebook 30 may be provided with some supplementary functions or complementary actions or change actions relative to the example of FIG. 10. In particular, as shown in each box of the data zone 32, each inserted item of data may, in turn, be a link, which may make it possible to open a window with inserts for other specific and preset details, while by actuating the corresponding link with a telephone number 40*b*, 41*b*, 42*b*, for example, by clicking, the cellular telephone 20 is instructed by the web browser 22 to call the given telephone number 40*b*, 41*b*, 42*b*.

Figures 12, 13:
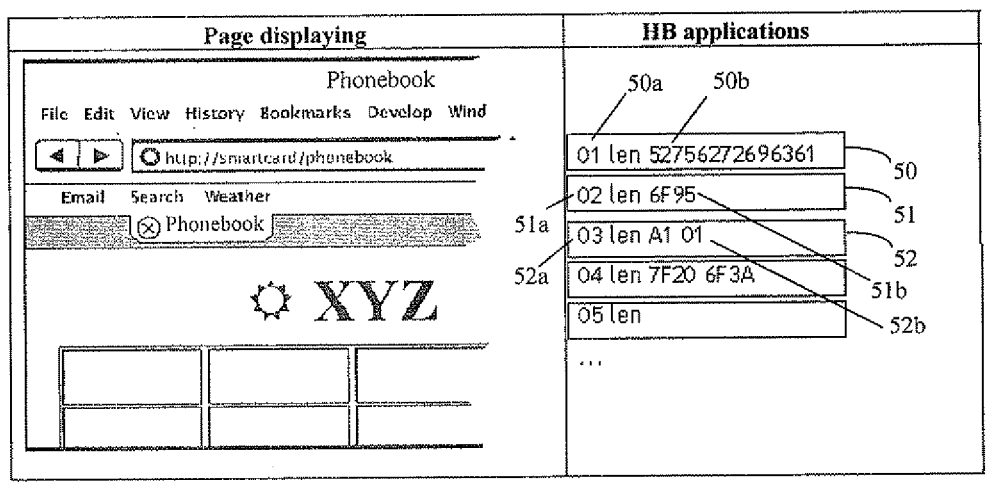
FIG. 12 shows a listing of HTML instruction strings suitable to make the phonebook of FIG. 10.
FIG. 13 shows a display layout of a dynamic web-like page and corresponding numerical codes suitable to make the page, according to the present invention.

FIG. 12 shows an example listing with HTML instruction strings allowing the creation of the dynamic phonebook 30, shown in FIG. 11. The method for generating the dynamic phonebook data display layout 30, as shown in FIG. 13, includes generating a code sequence 50, 51, 52, etc., suitable to define at least one portion of a data display layout and to store the code sequence 50, 51, 52, etc., in the memory of the smart card 23, and, in particular, in the second block 29. Each code of the code sequence 50, 51, 52, etc. has a first portion 50*a*, 51*a*, 52*a*, etc. which comprises a first numerical code 01, 02, 03, etc. and a second portion 50*b*, 51*b*, 52*b*, etc. which comprises a second numerical code correlated with the first numerical code 01, 02, 03, etc.

According to one aspect, each second code of the second portion 50*b*, 51*b*, 52*b*, etc. has a variable length which is stored in a first byte of the second portion 50*b*, 51*b*, 52*b*, etc. itself. For clarity's sake, in the attached figures the first byte is displayed with the indication "len".

In particular, the first numerical code 01, 02, 03, etc., is coded by a first coding means, or circuit, and corresponds to a primitive action. The primitive action Title, Put File, Set, etc., is a specific operation suitable to generate the structure or layout of the dynamic web page, and is coded in advance in accordance with a first correlation table T1, for example, the table shown in FIG. 14. Thus, in other words, the first numerical code 01, 02, 03, etc. is nothing other than an operation code.

The second numerical code corresponds to an item of data correlated with a respective primitive action Title, Put File, Set, etc. The item of data may be coded by a second coding means, or circuit. In other words, the code sequence 50, 51, 52, etc., all of which codes are numerical codes, produces an expressive and essential formal scheme of programming which makes it possible to reduce processing complexity together with the memory space required for storage.

According to one aspect, the codes of code sequence 50, 51, 52, etc. are coded in hexadecimal. Each code of code sequence 50, 51, 52, etc. is associated with a mnemonic code which is more convenient for an operator. However, the mnemonic codes are not stored in the smart card 23. By way of example, some primitive actions are stated below with a respective mnemonic code:

"Title" is an action which sets the title in the dynamic phonebook 30;
"Put File" is an action which takes the content from an elementary file EF;
"Set" is an action which initialises a variable;
"Select" is an action which selects data from another elementary file stored in the smart card 23;
"Table" is an action which defines a table structure;
"label N", where N is a decimal number, is an action which defines a reference point for a jump;

"varN=READ RECORD varK, offset=0, len=12" is an action which reads the first twelve characters of a record varK from a previously selected file;

"ROW" is an action which initialises a table row;

"CELL" is an action which initialises a table column; and

"PUT LINK" is an action which inserts a hypertext link; and so on.

Some primitive actions may include, as predefined, some settings of the associated item of data, such as, for example: font size, color, relative position within the page, and so on. A primitive action may include parameters which better specify or detail its effect, such as, for example, in the case of:

"varADN=READ RECORD varADN, varK, offset 12, len 20", an action which reads twenty characters of record varK of the previously selected file, jumping the first twelve characters; or in the case of "PUT LINK "Change name", "changename.HTML?p="+ varK", an accessory action which associates a link with the characters "Change name", allowing the name input in the phonebook to be changed, as will be described in greater detail in the description below.

The method then provides a first coding step which, by the first coding means, or circuit, creates the first correlation table T1 and defines a corresponding first numerical code 01, 02, 03, etc. for each primitive action. Furthermore, according to one aspect of the present invention, the first numerical code 01, 02, 03 occupies one byte in each code 50, 51, 52, etc.

The method then provides a second coding step for coding, by the second coding means, or circuit. Each item of data is correlated with a respective action or primitive operation Title, Put File, Set, etc., to define the content of the second portion 50b, 51b, 52b, etc. of each code 50, 51, 52, etc. According to one aspect, the second coding means, or circuit, code the data in corresponding hexadecimal numbers.

For example, by way of indicative, non-limiting example with reference to FIG. 17, which represents a draft with mnemonic code suitable to produce the dynamic phonebook 30, it will in particular be noted that:

"PHONEBOOK" is the item of data associated with the primitive action or operation Title;

"6F95" is the EF which in this example is associated with the primitive action Put File; and "varK=1" is the item of data associated with the primitive action Set and so on.

Thus, according to the example shown in FIG. 13, the code 50 comprises, in the first portion 50a, the first numerical code 01, derived from the first correlation table T1, and, in the second portion 50b, the second numerical code 52756272696361, which according to the hexadecimal ASCII code table corresponds to the word PHONEBOOK [RUBRICA in Italian].

Code 51 comprises, in the first portion 51a, the first numerical code 02, and, in the second portion 51b, the name of the corresponding EF, namely 6F95. Code 52 comprises, in the first portion 52a, the first numerical code 03, and, in the second portion 52b, a first variable A1, which is the value corresponding to varK according to coding on the basis of a second correlation table T2, one portion of which is shown in FIG. 15, and a respective first value to be initialised, namely 01.

Advantageously, according to a further aspect, the variables to perform loops, instruction jumps, or other actions, are thus appropriately coded and associated with a third numerical code or with a byte array, in accordance with an appropriate sequence, for example A0, A1, A2, etc. by the second coding means, or circuit, as shown in FIG. 15. The sequence of variables A0, A1, A2, etc. is stored in the first block 28. In particular, as a person skilled in the art will appreciate, the third numerical codes of the second correlation table T2, associated with the variables, make it possible to simplify any arithmetic operations or loops which can consequently be managed more easily and efficiently. Of course, according to one aspect, the first coding means, or circuit, could also create the second coding means, or circuit.

According to a further aspect, the second block 29 comprises a plurality of accessory change and/or association actions, such as for example, detail?p=, changename.HTML?p=, and changenumb.HTML?p=, which are in turn generated by associating a corresponding fourth numerical code 70, 71, 72, etc. with each accessory action, for example, by means of the second coding means, or circuit, as shown in FIGS. 19A and 19B. Such accessory actions are appropriately called within respective primitive actions.

In the presence of the fourth code 70, 71, 72, etc., some additional items of data are taken into consideration, in particular, a byte suitable to include the length "sublen", which differentiates the fourth code present in the second numerical code by indicating the number of bytes which make up the fourth code. In this manner, the value differentiates between the first "len" byte and the "sublen" byte, determining the number of bytes which make up the second code.

Advantageously, such accessory actions may not be executed automatically during the creation of the phonebook, but generally only when explicitly requested by the user of the cellular telephone 20 by an appropriate command, such as, a click on a predefined link or other item on the display.

Furthermore, some appropriate elementary files EF or support files 80, such as that shown in FIG. 16 identified, for example, with the hexadecimal code 6F95, are stored in the smart card 23. Such support files 80 include HTML instruction strings which, without being processed either by the web server 24 or by the first block 28, are appended by the respective associated primitive action to the dynamic web page under construction and transmitted directly to the web browser 22 of the cellular telephone 20. Such HTML instruction strings make it possible, for example, to activate the connection of the web browser 22 of the cellular telephone 20 to an external web server, for example, connected to the internet, to download and add an image or other items of information to the display layout and optionally any further primitive action, which may not be worth condensing by the numerical code sequence 50, 51, 52, etc.

According to another aspect, the method provides the step of automatically programming or updating the elementary files EF, making it possible to change the data displayed on the display of the cellular telephone the next time the code sequence 50, 51, 52, etc. is processed. According to a further aspect, the second coding step comprises processing a URL string for determining one or more items of data correlated therewith.

When a browser or HTTP client makes a request to an HTML page, it supplies the URL string which, according to IETF RFC 1738 specifications, comprises some predefined portions. An example of such a string is shown in FIG. 21.

In a typical HTTP request, the initial portion of the URL string identifies which resource on the entire Internet is to process the actual request. The initial portion is made up of the scheme, host, path, which respectively indicate a protocol, a server, and an allocated resource on the server.

The initial portion is optionally followed by a question mark and a subsequent portion, known as the query, which is usually structured as a list of parameters, each having a field and a respective value. The query is typically made available to the resource, which is to process the request, thus, in the present case, it is made available to the dynamic page generator, and in particular to the second block 29 and used to carry out processing which determines the appearance and content of the dynamic page to be generated. Furthermore, still according to IETF RFC 1738 specifications, a request may be of the GET type or POST type. When the request is of the POST type, further data of interest to the resource which is to process the request could be present in the URL string and input into a body field of the request itself. Such further data may be generated automatically by the browser or may be information input by the user.

According to one aspect, the method provides specific primitive actions for processing the URL string, some of which are:

var=PARSE URL param_name, which assigns to a variable var the value of the param_name parameter present in the URL string with which the request was made;

var=PARSE URL FAST n, which assigns to a variable var the value of a parameter which is present in the URL string and identified based upon the order in which it appears in the URL string, which is of course a predetermined order;

var=PARSE URL NEXT, which assigns to a variable var the value of a parameter present in the URL string which has not yet been processed, possibly the first parameter in such a condition; and var=POST, which assigns to a variable var the value of the optional body of the POST type request.

According to the present method, such primitive actions are thus coded according to the first correlation table T1 by generating the first numerical code 01, 02, 03, etc. of the first portion 50a, 51a, 52a of the code sequence 50, 51, 52, etc. The parameter fields of the query identify the query variables and are coded based upon the second correlation table T2, while the respective values associated with the variables identify the data to be displayed on the display. The data are advantageously stored after being appropriately coded in hexadecimal.

The coded variables and data create the second portion 50b, 51b, and 52b of the code sequence 50, 51, 52, etc. In the example shown in FIG. 21, the URL address http://smartcard/resource activates communication between the smart card 23 and the web browser 22 of the cellular telephone 20, while the query comprises two parameter fields and their respective values: PARAM1 and VALUE1, PARAM2 and VALUE2, in particular, "surname=Smith; name=John".

FIG. 22 shows coding of the example of FIG. 21 produced respectively with numerical code and mnemonic code, according to the method, and also corresponding HTML instructions. Advantageously, the code sequence provides just three codes 55, 56, and 57, which comprise the first portion coded according to the first correlation table T1, and the second portion coded by the second coding means, or circuit, using the second correlation table T2 to identify the variables. The variables in this case are A1, which is associated with the name John, coded in hexadecimal, and variable A2, which is associated with the surname Smith, coded in hexadecimal. Conveniently, as shown in FIG. 22, the method makes it possible to simplify the processing and/or management of URL strings, which is an activity which is put to very intensive use for generating dynamic web pages.

In general, due to the limited support offered by a smart card for managing the parameters present in URL strings, such management is somewhat laborious for the programmer. In contrast, the primitive actions according to the present embodiments do not compare between strings, but only a predetermined order of the parameters present, and this allows transparent processing of URL strings with a reduction in occupied memory space and fewer resources used for processing.

Based upon the description given, the code sequence 50, 51, 52, etc. makes it possible to produce logic flow and control schemes, web page layout, writing of elementary files or support files, management of a URL address, and/or extraction of information from the URL itself. When it comes to creating a dynamic web-like page, the primitive actions Title, Put File, Set, etc., are coded in advance by the first coding means, or circuit, to define corresponding first numerical codes 01, 02, 03, etc., and the code sequence 50, 51, 52, etc. is generated based upon the predefined data display layout of the web page 30, namely based upon the structure of the web page to be produced.

Such code sequence 50, 51, 52, etc. is stored in the smart card 23 and processed by the first block 28 to generate, before transmission to the web browser 22 of the cellular telephone 20 via the web server 24, the dynamic web page both producing the predefined positions for insertion of data or information and automatically inserting the data obtained from the elementary files stored in the smart card 23. In particular, the first block 28 processes and executes a translation of the code sequence 50, 51, 52, etc. into HTML instructions.

Such a dynamic web page is thus transmitted to the cellular telephone 20 for display on the display and for optional completion of the data which have to be obtained from the external network web server by the web browser 22. The web server 24 of the smart card 23 is the interface between the smart card 23 and the cellular telephone 20 and, according to one exemplary embodiment, one standard protocol which may be used for the transmission is identified by the OMA TS Smart Card Web Server Version 1.0 code or subsequent versions. However, other transmission protocols between the smart card 23 and cellular telephone 20 may be used.

Advantageously, the numerical code sequence 50, 51, 52, etc. makes it possible to achieve a dramatic reduction in the memory space occupied in the smart card 23 and in complexity during processing. This in particular makes it possible to obtain a dynamic web-like page, which is processed in less time, so reducing waiting between the user request and the beginning of transmission of the page to the web browser 22 of the cellular telephone 20.

Advantageously, the present embodiments thus make it possible to produce dynamic web-like pages with a plurality of automatically updatable applications and well developed interaction, while nevertheless retaining simple processing and using relatively little memory space. In particular, the elementary files EF stored in the smart card 23 may be updated automatically by an intentional or programmed connection of the cellular telephone 20 to the network of the telephone operator or to another internet-like network, so generating, on subsequent processing of the corresponding application, an automatic update of the data on the display of the cellular telephone 20 itself.

Figure 9:
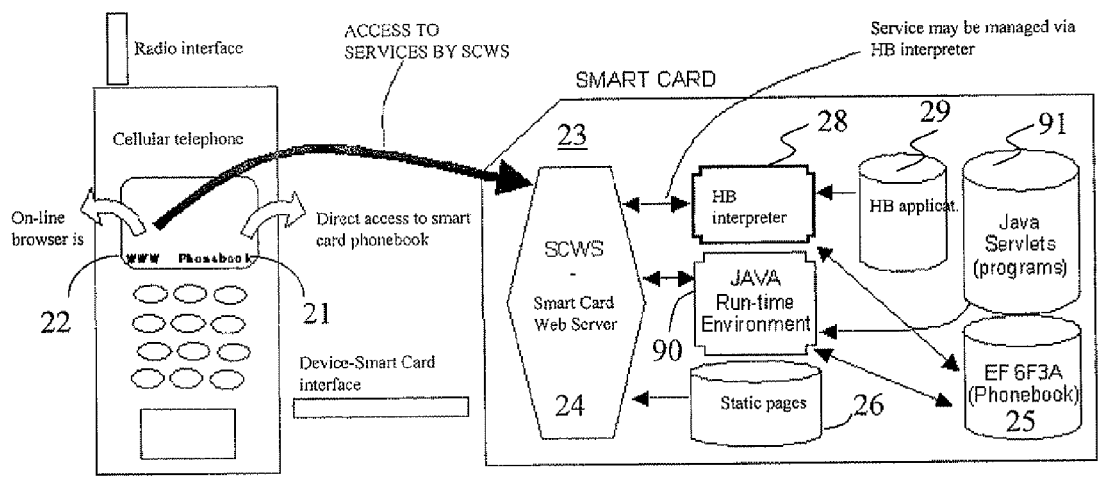
FIG. 9 is a schematic diagram of a further example of a cellular telephone and smart card according to the present invention.

According to a further aspect, a smart card 23 suitable to create a data display layout processed with a method according to the present embodiments may also comprise a third Java™ Run-time Environment or Javacard Run-time Environment block 90 which interacts with a fourth Java™ Servlets block 91, as shown in FIG. 9, for generating standard HTML instruction strings.

Advantageously, in such a case, based upon the developers' preferences and of variation in content, some dynamic web-like pages may be produced directly in standard mode by the third block 90, while other dynamic web-like pages may, in contrast, be generated by the first block 28. Otherwise, appropriate and efficient interaction between the two blocks makes it possible to generate some portions of dynamic web-like pages by means of the first block 28 and to generate the remaining portions of the dynamic web-like pages by the third block 90.

The present embodiments also relate to a method for coding a plurality of HTML instruction strings, comprising respective HTML elements, suitable to produce a data display layout. The method comprises the step of generating a code sequence 50, 51, 52, etc. suitable to define the data display layout, each code of the code sequence 50, 51, 52, etc. having a first portion 50a, 51a, 52a, etc. suitable to comprise a first numerical code 01, 02, 03, etc. together with a second portion 50b, 51b, 52b, etc. suitable to comprise a second numerical code.

The method also comprises the steps of generating a plurality of primitive actions Title, Put File, Set, etc. correlated with the HTML elements and making by means of first coding means, or circuit, a first correlation table T1 by coding the primitive actions Title, Put File, Set, etc. with a corresponding first numerical code 01, 02, 03, etc. The method also includes sequentially comparing the plurality of HTML instructions with the primitive actions Title, Put File, Set, etc. present in the first correlation table T1 and defining, for each HTML element, a corresponding first numerical code 01, 02, 03, etc. by generating the first portion for a corresponding code 50, 51, 52, etc. The method further includes generating the second portion 50b, 51b, 52b of the corresponding code 50, 51, 52, etc. by coding using a second coding means, or circuit, the respective HTML element suitable to produce an item of data from said plurality of items of data. According to one aspect, the first and second coding means code, or circuit, the code sequence 50, 51, 52, etc. in corresponding numbers coded in hexadecimal.

According to another aspect, the second numerical code of each second portion 50b, 51b, 52b, etc., is identified by a plurality of bytes and comprises a first byte, which identifies the length of the item of data present in the second code. In the examples shown, purely for greater clarity, the byte is denoted "len". According to a further aspect, the primitive actions Title, Put File, Set, etc. are highly specified, previously coded actions for creating the first correlation table T1.

In particular, each HTML element, as shown in FIG. 20, comprises an item of information enclosed within markup tags. The tags are made up of a sequence of characters enclosed between two angle brackets, for example, <html>, <head>, <Title>, etc.

According to one aspect, the method provides generating the plurality of primitive actions in relation to the specific data display layout, and in such a case, some primitive actions include some predefined settings relating to the item of data to be displayed on the device display, such as, font size, color, relative position in the display, and others. Some HTML elements are not coded, being such items of information which can be automatically managed by the first block 28 without further programming, or are already included in a specific primitive action. Furthermore, some portions of HTML instructions are grouped together in a single primitive action, for example, in the case shown in FIG. 16, the sequence of HTML instruction strings is stored in an elementary file EF or support file 80 appropriately identified and stored in the smart card 23. In the example, the support file 80 is identified as an elementary file EF 6F95 and called with the primitive action PUT FILE, which based upon the first correlation table T1 corresponds to the first numerical code 02.

Other primitive actions are specific and appropriately predefined sets of coding without having a corresponding HTML instruction string. For example, the primitive action "varN=READ RECORD varK, offset=0, len=12" is essentially an action which reads the first twelve characters of a record varK from a previously selected file. The primitive action furthermore makes reference to appropriate variables "varN" and "varK", which are themselves coded, for creating a second correlation table T2. FIG. 15 shows an example of a portion of a table.

In particular, the variables present in the second correlation table T2 are appropriately coded and associated with a third numerical code or with a byte array, in accordance with an appropriate sequence, for example A0, A1, A2, etc., for example, by the second coding means, or circuit. Still more particularly, as a person skilled in the art will appreciate, the third codes associated with the variables may be deemed to be integers, and this simplifies any arithmetic operations or loops defined by the variables, making them more readily and efficiently managed.

According to a further aspect, a plurality of accessory change and/or association actions, such as, for example, the HTML instructions defined by the HTML elements comprising detail?p=, changename.HTML?p=, and changenumb.HTML?p=, are called internally within the primitive actions and are generated, in turn, by associating a corresponding fourth numerical code 70, 71, 72, etc. by the second coding means, or circuit, as shown in FIGS. 19A and 19B.

In the presence of each fourth code 70, 71, 72, etc., some additional items of data are taken into consideration, and in particular, a byte suitable to include the length "sublen", which differentiates the fourth numerical code present in the second numerical code by indicating the number of bytes which make up the fourth code. Furthermore, the value differentiates between the first "len" byte and the "sublen" byte, determining the number of bytes which make up the second code.

According to another aspect, some support files 80 comprise, for example, HTML instruction strings which make it possible to add an image or other items of information to the display layout, which generally must be downloaded with a separate connection to an external server, for example to another internet-like network or to the Smart Card Web Server 24 of the smart card 23 itself.

According to some examples shown in FIG. 20, the HTML instruction string <title>PHONEBOOK</title> is coded with a first code 50, which comprises, in the first portion 50a, the first numerical code 01, corresponding according to the first correlation table T1 to the primitive action Title, and, in the second portion 50b, the second numerical code 52756272696361 which according to the hexadecimal ASCII code table corresponds to the word PHONEBOOK [RUBRICA in Italian].

The second code 51 makes reference to a plurality of HTML instruction strings present in a support file 80, for example, the file EF identified with the hexadecimal code 6F95 shown in FIG. 16. In particular, in the stated example, the image to be included in the display layout is present in the file "EF-6101.gif", which generally must be downloaded by a further connection to the web server 24 of smart card 23.

In such a case, the HTML instruction string is not processed, but is transmitted directly to the web browser of the device. The second code 51 thus comprises, in the first portion 51a, the first numerical code 02 and, in the second portion 51b, the name of the referred EF, namely 6F95. The third code 52, in contrast, comprises in the first portion 52a, the first numerical code 03, and in the second portion 52b, a first variable A1 and a respective first initialization value, which in the example corresponds to 01.

Essentially, the numerical code sequences 50, 51, 52, etc., each of which comprises a first and a second numerical portion, thus replace the sequence of HTML element strings, so advantageously making it possible to reduce the occupied memory space both in terms of storage in the smart card and in terms of processing. Thus, the method makes it possible to achieve a substantial reduction in occupied memory space, and also to reduce waiting time between the user request and the beginning of transmission, after processing, to an external browser.

The present embodiments also relate to a system for generating a data display layout on a display of an electronic device 20, for example, the device shown in FIG. 8, equipped with at least one smart card comprising instructions suitable to produce the data display layout. Conveniently, the plurality of instructions is a code sequence 50, 51, 52, etc. obtained by a method of the type previously described, for which details and cooperating parts having the same structure and function will be denoted with the same reference numbers and letters. Each code of such a code sequence 50, 51, 52, etc. has a first portion 50a, 51a, 52a, etc. comprising a first numerical code 01, 02, 03, etc. and a second portion 50b, 51b, 52b, etc. comprising a second numerical code.

The smart card comprises a first coding means, or circuit, suitable to produce a corresponding first numerical code 01, 02, 03, etc. by coding primitive actions Title, Put File, Set, etc. associated with the instructions, together with second coding means, or circuit, suitable to produce the second numerical code corresponding to an item of data correlated with a respective primitive action Title, Put File, Set, etc. Such a code sequence 50, 51, 52, etc. is accordingly processed by the smart card to create the data display layout on the device display by setting the items of data in predefined positions of the layout.

According to one aspect, each code of the code sequence 50, 51, 52, etc. comprises numbers coded in hexadecimal. According to a further aspect, the smart card comprises a first correlation table T1 created by the first coding means, or circuit, for example, the table shown in FIG. 14, which makes it possible to code the primitive actions Title, Put File, Set, etc. with the corresponding, unambiguous first numerical code 01, 02, 03, etc. to generate the first portion 50a, 51a, 52a, of the code sequence 50, 51, 52, etc.

According to another aspect, the smart card comprises a second correlation table T2 having a plurality of variables appropriately coded and associated with a third numerical code by the second coding means, or circuit, to generate an appropriate sequence A0, A1, A2, etc., as shown in FIG. 15. Such variables are used to generate the second portion 50b, 51b, 52b, corresponding to the item of data correlated with the respective primitive action Title, Put File, Set, etc.

According to a further aspect, the smart card stores at least one elementary file EF comprising a plurality of instructions, namely HTML elements suitable to define one of the items of data. Such HTML elements are transmitted, without being processed by the smart card 23, to a web browser 22 associated with the cellular telephone 20.

According to a further aspect, the smart card comprises means, or a circuit, suitable to define the length of each second numerical code of the second portion 50b, 51b, 52b, etc. The length is thus stored in at least one "len" byte of each second numerical code of the second portion 50b, 51b, 52b, etc.

According to a further aspect, the smart card 23 process a URL string for determining one or more data correlated therewith. The URL string is a string supplied by a browser or by an HTTP client to make a request from an HTML page. According to IETF RFC 1738 specifications, the URL string comprises predefined portions.

In a typical HTTP request, as shown in FIG. 21, the initial portion of the URL string identifies which resource on the entire Internet is to process the actual request and is followed by a question mark and by a subsequent portion, known as the query. The query is usually structured as a list of parameters, each having a field and a respective value.

In the example shown in FIG. 21, the URL address http://smartcard/resource activates communication between the smart card 23 and the web browser 22 of the cellular telephone 20, while the query comprises two parameter fields and their respective values, PARAM1 and VALUE1, PARAM2 and VALUE2. In the explanatory example, the query is "surname=Smith; name=John". According to the system, the first coding means, or circuit, and the second coding means, or circuit, of the smart card 23 make it possible to process the query by defining the code sequence 50, 51, 52, etc. in accordance with the above-stated method, as shown in particular in FIG. 22.

By way of completeness, in FIGS. 24A and 24B a servlet in Javacard language is illustrated that can process the URL string in the example shown in FIG. 21. The servlet example uses API (Application Programming Interface) dedicated to the web server, described by the standard ETSI TS 102 588 version 7.2.0 Release 7 or later. By comparing the sequence of codes 50, 51, 52, etc. in FIG. 21 and the servlet in FIGS. 24A and 24B, the method reduces the computational complexity of process, as well as the storage space in memory in the Smart Card 23.

According to a further aspect, it should be noted that the code sequence 50, 51, 52, etc., suitable to produce a portion of a data display layout, may be used not only in a cellular telephone or other device compatible with Smart Card Web Server, but also in a cellular telephone which is not compatible with Smart Card Web Server. In this latter case, as shown in FIG. 23, there will be a difference in the data displayed on the display of the cellular telephone, but all the advantages of the present embodiment will be retained, namely the reduction in space occupied by the code sequence 50, 51, 52, etc. in the memory of the smart card 23 and the reduction in processing time of the code sequence.

The main advantage of the method is that of generating dynamic web-like pages with appropriate numerical codes which, when specifically defined, make it possible to achieve a significant reduction in occupied memory, and thus in the number of instructions stored in the smart card. Furthermore, the effect of method is that of supplying the dynamic web-like page to the device subsequently to its being processed directly by the smart card.

Furthermore, the code sequence generated by the method makes it significantly possible to reduce the repetitive parts and static parts present in the sequence of HTML instruction strings generated by prior art methods.

Moreover, the method and in particular the first coding means, or circuit, and the second coding means, or circuit, make it possible to generate a reduced sequence of highly specialized, predefined numerical codes which allow the creation of particularly complex dynamic web-like pages with the items of data stored in predefined positions on the display layout. Moreover, the code sequence converted into hexadecimal numbers makes it possible to minimize occupied memory space and to achieve a significant reduction in parsing time during processing. In conclusion, the code sequence generated according to the method makes it possible to create dynamic web-like pages with a plurality of applications and well developed interaction, while nevertheless retaining simple processing and requiring greatly reduced memory space.

That which is claimed:

1. A method for generating at least one portion of a data display layout on a display of a device cooperating with at least one smart card comprising a smart card body and circuitry carried by the smart card body, the method comprising:
generating a code sequence to define the at least one portion of the data display layout and storing the code sequence in the at least one smart card, each code of the code sequence having a first portion comprising a first numerical code, and a second portion comprising a second numerical code, the first numerical code corresponding to a primitive action from among a plurality thereof, and the second numerical code corresponding to a coded item of data correlated with the primitive action, the primitive action comprising an action for processing a uniform resource locator (URL) string having a URL address therein and an action related to a display characteristic, the coded item of data being based upon the URL string;
processing the code sequence to generate the at least one portion of the data display layout with the coded item of data in a selected position and based upon the display characteristic; and
wirelessly sending, based upon the URL address, the at least one portion of the data display layout with the coded item of data in the selected position and with the display characteristic to the display of the device.

2. The method according to claim 1, wherein generating the code sequence comprises generating a first correlation table for coding the plurality of primitive actions.

3. The method according to claim 2, wherein the second portion further comprises a third numerical code; and wherein generating the code sequence further comprises coding a sequence of variables associated with an item of data by generating a second correlation table associating a corresponding third numerical code with each variable of the sequence of variables.

4. The method according to claim 1, wherein the primitive action comprises a primitive action for associating the coded item of data with a plurality of instruction strings stored in an elementary file of the at least one smart card.

5. The method according to claim 4, further comprising programming the elementary file.

6. The method according to claim 1, wherein generating the code sequence comprises associating the second portion with at least one byte for defining a length of the second numerical code.

7. A method for coding a plurality of hypertext mark-up language (HTML) instructions, comprising respective HTML elements for generating at least one portion of a data display layout on a display of a device, the method comprising:
generating a code sequence to define the at least one portion of the data display layout and storing the code sequence in at least one smart card comprising a smart card body and circuitry carried by the smart card body, the at least one smart card cooperating with the device, each code of the code sequence having a first portion comprising a first numerical code, and a second portion comprising a second numerical code;
generating a plurality of primitive actions correlated with the HTML elements, the plurality of primitive actions comprising an action for processing a uniform resource locator (URL) string having a URL address therein and an action related to a display characteristic;
generating a first correlation table by coding each of the plurality of primitive actions with the corresponding first numerical code;
generating the code sequence comprising generating the first portion by comparing the HTML instructions with the plurality of primitive actions to define the corresponding first numerical code for the HTML element;
generating the code sequence comprising generating the second portion by coding the respective HTML element to produce an item of data from a plurality of items of data, the item of data being based upon the URL string; and
wirelessly sending, based upon the URL address, the at least one portion of the data display layout with the item of data to the display of the device for display based upon the display characteristic.

8. The method according to claim 7 further comprising storing a plurality of HTML elements defining one of the plurality of items of data in an elementary file of the at least one smart card, and associating the elementary file with at least one action of the plurality of primitive actions.

9. The method according to claim 7, wherein generating the code sequence further comprises defining a length of the second numerical code and associating the length with at least one byte of the second portion.

10. A system comprising:
an electronic device comprising a display for displaying at least a portion of a data display layout, the at least one portion of the data display layout being configured to have data items in selected positions in the data display layout; and
at least one smart card having instructions for generating the at least one portion of a data display layout, the instructions comprising a code sequence, each code of the code sequence having a first portion comprising a first numerical code and a second portion comprising a second numerical code, said at least one smart card comprising
a smart card body,
a first coding circuit carried by said smart card body for generating the first numerical code by coding a plurality of primitive actions associated with the instructions, at least one of the plurality of primitive action comprising an action for processing a uniform resource locator (URL) string having a URL address therein and an action related to a display characteristic,
a second coding circuit carried by said smart card body for generating the second numerical code corresponding to an item of data correlated with a respective one of the plurality of primitive actions, the item of data being based upon the URL string,
said first and second coding circuits processing the code sequence to create the at least one portion of the data display layout on the display by setting the items of data in the selected positions in the layout and based upon the display characteristic, and
circuitry coupled to said first and second coding circuits to wirelessly send, based upon the URL address, the at least one portion of the data display layout with the coded item of data in one of the selected positions and with the display characteristic to the display of the electronic device.

11. The system according to claim 10, wherein said at least one smart card comprises an elementary file stored therein, the elementary file comprising a plurality of hypertext mark-up language (HTML) elements for defining one of the data items.

12. The system according to claim 11, wherein said electronic device comprises a web browser for processing the plurality of HTML elements.

13. The system according to claim 10, wherein said at least one smart card comprises a circuit for defining a length of each second numerical code, the length being stored in at least one byte of the second numerical code.

14. A smart card integrated circuit (IC) for a smart card comprising a smart card body for carrying the smart card IC, and for cooperating with an electronic device comprising a display for displaying at least a portion of a data display layout, the at least one portion of the data display layout being configured to have data items in selected positions in the data display layout, the smart card integrated circuit (IC) comprising:

- a memory having instructions for generating the at least one portion of a data display layout, the instructions comprising a code sequence, each code of the code sequence having a first portion comprising a first numerical code and a second portion comprising a second numerical code;
- a first coding circuit for generating the first numerical code by coding a plurality of primitive actions associated with the instructions, the plurality of primitive actions comprising an action for processing a uniform resource locator (URL) string having a URL address therein and action related to a display characteristic; and
- a second coding circuit for generating the second numerical code corresponding to an item of data correlated with a respective one of the plurality of primitive actions, the coded item of data being based upon the URL string;
- said first and second coding circuits processing the code sequence to create the at least one portion of the data display layout on the display by setting the items of data in the selected positions in the layout and based upon the display characteristic; and
- circuitry coupled to said first and second coding circuits to wirelessly send, based upon the URL address, the at least one portion of the data display layout with the coded item of data in one of the selected positions and with the display characteristic to the display of the electronic device.

15. The smart card integrated circuit (IC) according to claim 14, wherein said memory comprises an elementary file stored therein, the elementary file comprising a plurality of hypertext mark-up language (HTML) elements for defining one of the data item.

16. The smart card integrated circuit (IC) according to claim 14, further comprising a circuit for defining a length of each second numerical code, the length being stored in at least one byte of the second numerical code.

* * * * *